United States Patent [19]

Weiss et al.

[11] Patent Number: 4,534,856
[45] Date of Patent: Aug. 13, 1985

[54] ELECTRODYNAMIC METHOD FOR SEPARATING COMPONENTS

[75] Inventors: Louis C. Weiss; Devron P. Thibodeaux, both of Metairie, La.

[73] Assignee: The United States of America as represented by the Secretary of Agriculture, Washington, D.C.

[21] Appl. No.: 527,730

[22] Filed: Aug. 30, 1983

[51] Int. Cl.³ ............................................... B03C 7/00
[52] U.S. Cl. ...................................... 209/1; 209/127.1
[58] Field of Search ............................... 209/213–214, 209/212, 1, 127–131

[56] References Cited

U.S. PATENT DOCUMENTS 2,839,189  6/1958  Johnson ............................. 209/129
3,801,869  4/1974  Masuda ............................... 55/123
4,343,695  8/1982  Watabe ............................. 209/212

FOREIGN PATENT DOCUMENTS 288907  8/1971  U.S.S.R. ............................. 209/131

OTHER PUBLICATIONS

Louis C. Weiss, "Electrodynamic Behavior of Textile Fibers", *Textile Research Journal,* vol. 52, No. 1, (Jan. 1982).
Staub-Reinhalt, Luft, vol. 30, No. 11, (Nov. 11, 1970).

Primary Examiner—Frank W. Lutter
Assistant Examiner—Wm. Bond
Attorney, Agent, or Firm—M. Howard Silverstein; David G. McConnell; Raymond C. Von Bodungen

[57] ABSTRACT

A method of separating the components contained in agricultural by-products is disclosed. A set of parallel electrodes encased in a plastic panel and energized by an A.C. power supply is used to create an undulating traveling wave electric field. A voltage charge is first applied to the individual components. The voltage is then increased to effect levitation and movement of the components in opposite directions which results in separation. The voltage is cycled between charging and separating voltages to move the components over a distance for collection and recovery.

8 Claims, 4 Drawing Figures

ELECTRODYNAMIC METHOD FOR SEPARATING COMPONENTS

BACKGROUND OF THE INVENTION

1. Field of the Invention

This invention relates to methods for separating components by means of electrodynamic forces.

2. Description of the Prior Art

Previously, separation of a mixture into its components has been accomplished by means of various methods including the following: mechanical separation, such as screening, sifting, gravity, pneumatic, etc.; chemical methods, such as floating, skimming, treating, etc.; electrical methods such as electrostatic drums, rotations, etc. All of these methods entail some combination of factors which involves acting on differences in size, size distribution, shape, moisture content, mass, charge, composition of matter, etc.

Masuda, S., Fujibayashe, K., and Ishida, K. "Electrodynamic dynamic Behavior of Charged Aerosol Particles in Nonuniform Alternating Fields and Its Application in Dust Control," *Staub-Reinhalt. Luft.* 30, 4–14 (1970), reported a method of transporting materials by means of electrodynamic forces. However, no discovery of separation of components has ever been made using A.C. electrodynamic forces prior to applicants' disclosure.

SUMMARY OF THE INVENTION

A method for separating components of agricultural by-products is disclosed. Selected agricultural by-products are fed onto an electric contact panel. The panel is energized with sufficient A.C. potential to charge the components and then sufficiently cycled to levitate and then separate the components of the by-products.

DESCRIPTION OF THE PREFERRED EMBODIMENTS

Applicants' method for separating objectionable components from by-products of agricultural processes offers unlimited potential for recovering or removing valuable components. Using applicants' unique electric field discovery, agricultural by-products can be enriched significantly. Enrichment is accomplished by the dynamic forces resulting from an electrical field that is created by a set of parallel electrodes encased in a plastic panel and connected to an A.C. power supply. When the panel is activated particles on the surface become charged, levitated and transported. When a mixture of particles is brought into contact with the panel, a difference in the charge is imparted to the individual components; opposite directions of transportation occur to the components and separation results. This separation or sorting of components is independent of size and shape since it is dependent mostly on charge-to-mass ratio. The electric contact panel used in applicants' examples was designed and built by Masuda and is described in U.S. Pat. No. 3,801,869, the disclosure of which is hereby incorporated by reference.

MATERIALS AND METHODS

Samples

Three different agricultural mixtures, by-products of processes, were used to determine the degree to which an electric contact curtain could separate components. One material chosen was crushed sunflower seed, the by-product from a commercial oil extraction process. It consists of potentially valuable seed proteins mixed with fragments of the seed hulls. The similarities in size of these components are such as to render separation by normal procedures diffucult or even unfeasible. The second sample was the waste or "unders" from the liquid cyclone process which produces protein enriched flour from cottonseed. These unders are essentially a mixture of cottonseed proteins, pigmented particles of almost pure gossypol, and some protein particles contaminated with gossypol. The third sample, waste collected at the baghouse of a commercial grain elevator, was a multi-component mixture of grain, dust, hull, and chaff from wheat.

Procedures

Materials were fed onto the surface of the panel. Separation was accomplished by first subjecting the sample to a relatively small charging voltage for about 40 sec followed by a ⅓ increase in voltage for about 10 sec. Voltage was then reduced to the original value. This impulse-cycle technique was gently repeated until separation was obtained. Voltage is critical to avoid a total transportation phase other than separation. The voltage depends upon the materials to be separated and the environmental conditions. Sunflower seeds and wheat grain usually require a charging voltage of 4 kV with a slightly higher voltage for cottonseed.

Experiments were conducted at ambient conditions of about 21° C. and a relative humidity of less than 55%. After each experimental run, the separated fractions were collected, weighed, and subjected to the following analyses: mass separation ratio, charge-to-mass ratio, nitrogen content, moisture regain, particle area, circularity index, and gossypol content.

Separation ratio of good component to reject material, determined by collecting and weighing the two separated components, is calculated as a fraction of the starting material (herein referred to as the "Parent"). Charge-to-mass ratio is based upon a specific charge determined by collecting the selected fraction in a "Faraday Cup" placed at the edge of the plate and grounded through a Keithley 610B Electrometer. The material collected in the cup is weighed and the charge per unit mass is determined.

The nitrogen content, determined by the Kjeldahl method, gives an index of the protein content of the separated components and their parent. The moisture regain or water absorbing ability of each sample and the gossypol content of the cottonseed were determined by standard methods. (Masuda, S., Booth for Electrostatic Powder Painting with Contact Type Electric Field Curtain. U.S. Pat. No. 3,801,869 (April 1974); American Society for Testing and Materials, Committee D-13, D629-57T, Philadelphia, Pa. (1973); and, American Oil Chemists Society, Official Method, Ba 3-38, Ba 7-58, Ba 8-78 (1975)) Each of these properties is expressed as a fraction of the sample's oven-dry weight.

The size and shape parameters of parents and separated components were obtained by use of the Quantimet 723-Image Analyzer. This provides a statistical analysis which computes the mean value for the projected, cross-sectional area and standard deviation for each sample. With this area, "A," the analyzer also measures a perimeter, "p." As the ratio $4\pi A/p^2$ approaches one, the shape of the area approaches a circle. (Schloemer, H., "Fullness of Rayon Cross-Section" *Kunstseide* 12, 380–383 (1930)).

Process

In the Masuda-type travelling-wave apparatus, parallel sets of individual conductors connected to an A.C. electrical source form an undulating electric field in the surrounding air. This series of non-uniform electric waves is named the "Electric Curtain." If particles are charged and then placed in this curtain, they are confined without touching a barrier. But, if the particles are poorly charged, some loss occurs. Placing a dielectric sheet over the conductors not only prevents these losses but automatically causes an interchange of electrons among the particles and with the sheet. A significant electrical charge is established on these particles making external charging unnecessary. If three phases of an A.C. voltage are connected successively to the different conductors, a series of traveling electric-waves are created. Material within the field is carried along as if on an invisible conveyor. This transporation is in a direction that is perpendicular to the grid lines. Such an apparatus as the electric grid covered with a dielectric sheet is named a "Contact-type, Electric Curtain Panel" or, more simply, an electric contact panel (Weiss, L. C., "Electrodynamic Behavior of Textile Fibers," *Textile Rsearch J.* 52, 59–65 (1982) and Masuda, S., Booth for Electrostatic Powder Painting with Contact Type Electric Field Curtain, U.S. Pat. No. 3,801,869 (April 1974)). Many materials are simultaneously charged, levitated against gravity, and transported by the electric contact panel.

The panel used was 0.09 m² or a square foot in area with a 3 mm spacing between grid conductors. The power source was a 60 Hz, three-phase, high voltage supply continuously variable between 0 and 30 KV. The present range is only the lower ⅓ of the design. Details of the electrical circuit, its operation, and panel construction have been published (Weiss, L. C., "Electrodynamic Behavior of Textile Fibers", *Textile Research J.* 52, 59–65 (1982).

Separation

Theory can predict electrodynamic motion in only one direction. However, under certain conditions, some materials nearest the surface of the panel were observed to be transported in opposite directions by a reverse force. If the panel were considered to be a linear electric motor, then this reverse force would be analogous to a "back emf" or counter-productive, electromotive force. This backward force may be useful with a mixture of powders. Mixtures that often occur as the by-products of agricultural processes were tested for separation. For the first time, significant separations or refinements were achieved solely by an A.C. electric contact panel. Notably among these were the extractions of pigmented gossypol from cottonseed flour and of hulls from sunflower seed powder.

Figure 1:
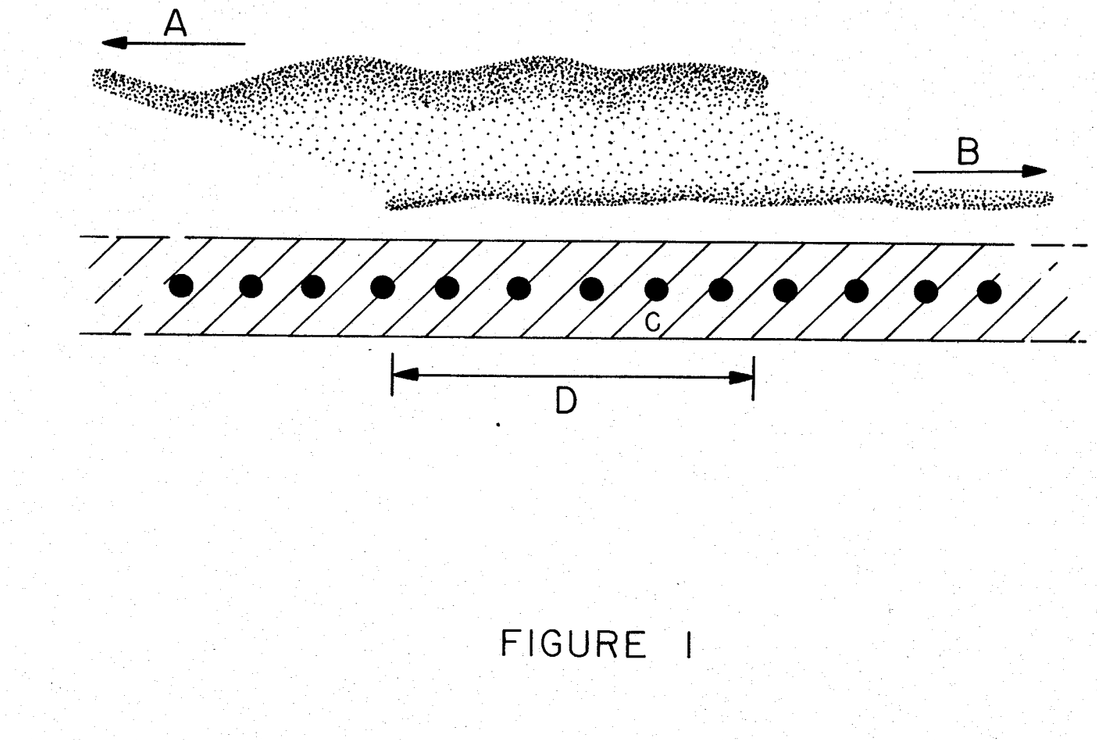
FIG. 1 is a schematic diagram visualizing the method by which separation of the components of an agricultural by-product mixture occurs.

Referring to FIG. 1 the electric contact panel is represented by the letter "C" with the location where particles are fed onto the panel indicated by the area "D". Directly above and along the length of "D" is a representation approximating the motion of a cloud of particles. When the panel is activated in the separation mode, the majority of a sample is transported in the expected direction, "A". Using a water-wave analogy, this is defined as the "Surfing" direction.

A smaller amount—usually a more homogeneous component—is transported in the opposite direction, "B." This is said to be caught in the "Undetow." This was a new and unexpected result.

RESULT AND DISCUSSION

One by one, wastes from agricultural processes were fed onto the panel. Components were separated, collected, and their specific charge and percent nitrogen determined. Results for these samples are presented in the first columns of Table I. Their dimensional values of size and shape are listed in the last columns. Section A of the Table presents the values of lycopodium, a reference material that approaches the ideal particle for gauging electrical activity. It is a naturally occurring dielectric with a uniform diameter of 30 μm and serves to standardize panel performance. When the electric panel is operated at 5 kV, a charge of about $10^{-16}$ coulombs per lycopodium particle is determined. During this time the particles couple well with the travelling wave and move in the surfing direction. Of all the particles tested, those of the positively charged lycopodium are the smallest, the most uniform, and the most spherical.

TABLE I

| COMPONENT | Charge/Mass (nc/g)[a] | Nitrogen × 10² (gN/g) | Moisture Regain (%) | Projected Area | | Circularity Ratio |
|---|---|---|---|---|---|---|
| | | | | Mean (mm²) | Std. Dev. (mm²) | |
| (A) Lycopodium | Classical electrical standard | | | | | |
| (Pure) | +500 | 1.33 | 3.25 | $0.71 \times 10^{-3}$ | $0.12 \times 10^{-3}$ | 0.90 |
| (B) Sunflower Seed | Parent is by-product after solvent extraction. | | | | | |
| Parent | — | 4.70 | 8.67 | 0.269 | 0.264 | 0.78 |
| Meal | +175 | 5.19 | 8.60 | 0.349 | 0.451 | 0.74 |
| Hull | −3,000 | 3.24 | 8.78 | 0.255 | 0.199 | 0.75 |
| (C) Cottonseed | Parent is "unders" from liquid cyclone. | | | | | |
| Parent | — | 8.50 | 8.52 | $0.359 \times 10^{-2}$ | $0.668 \times 10^{-2}$ | 0.79 |
| Meal | +1,420 | 9.70 | 9.79 | $0.223 \times 10^{-2}$ | $0.580 \times 10^{-2}$ | 0.81 |
| Gossypol | −10,124 | 8.08 | 8.00 | $1.067 \times 10^{-2}$ | $1.282 \times 10^{-2}$ | 0.78 |
| (D) Grain Dust | Parent is waste from elevator baghouse. | | | | | |
| Parent | — | 2.12 | 9.34 | 0.352 | 1.080 | 0.74 |
| Conglomerate | +540 | 2.01 | 9.26 | 0.461 | 0.808 | 0.70 |
| Hull | −720 | 2.00 | 10.38 | 0.309 | 0.313 | 0.72 |

TABLE I-continued

| | Some Properties of Selected Seed By-Products | | | | | |
|---|---|---|---|---|---|---|
| | | Nitrogen | Moisture | Projected Area | | |
| COMPONENT | Charge/Mass $(nc/g)^a$ | $\times 10^2$ (gN/g) | Regain (%) | Mean $(mm^2)$ | Std. Dev. $(mm^2)$ | Circularity Ratio |
| Wheat | +0.04 | 2.17 | 9.02 | 4.803 | 3.14 | 0.83 |

$^a$nc is nano (or $10^{-9}$) coulombs.

Sunflower Seed

After solvent extraction of the sunflower seed oil a powder of crushed components accumulates. When the parent is placed upon the energized electric contact panel, it is charged, levitated, and transported. Simultaneously, separation into two components occurs. The larger volume is a component of refined meal moving in the surfing direction. Another component that is smaller in volume moves in the opposite or undertow direction. It is composed essentially of hull fragments and is the least variable in appearance. The hull component greatly differs in appearance from the meal component or their parent mixture. The separation is not absolute but is rather a selective concentration of components at opposite ends of the panel. Sunflower seed powder is among the most active materials tried on the panels to date. The meal component acquires a net positive charge while the hull component acquires a negative charge. The meal enriched component has an increase in nitrogen, indicating an increase in its concentration of protein. Correspondingly, the hull component has a reduction in nitrogen concentration. This single-stage process yields a meal component with 0.02 g nitrogen per gram weight more than found in the separated hulls. Nitrogen rankings for the parent and both components of this seed display promising results.

Data are presented in Table I for the size and shape of these sunflower seed components. The mean values of the areas for these three specimens imply that hulls are the smallest and the standard deviations indicate that hulls are also the least variable. The standard deviations show that the distributions in sizes are much greater than the differences among the means; or, the components do not significantly differ in size. The area-to-perimeter ratios indicate that all samples are fairly circular with the meal and hull components being similar in shape. Image analysis allows one to imply that neither size nor shape play a major role in the separation of sunflower seed achieved by this electric contact panel.

EXAMPLE 1

Sunflower Seed By-Product

Crushed sunflower seed is the powdery by-product accumulated after the solvent extraction of a valuable sunflower seed oil. Two grams of the material were placed on the surface of the electric contact panel. This plastic panel was energized with a potential of 2 kV charging all components of the sunflower seed by-product for 40 sec. The A.C. electrical potential was then raised to 3 kV for the next 10 sec. This energy impulse levitated the sample as represented in FIG. 1. Simultaneously, some of the sample moved in a forward "surf" direction (A) and some sample, at a lower height, moved in a backward or "undertow" direction (B). These directions differed by 180°. After the 10 second interval voltage was reduced to the original value and the cycle began again. This impulse-cycle technique, presented in FIG. 2, was repeated for 20 minutes till separation was completed.

Components were collected at opposite sides of the panel. On visual examination the undertow component was fragments or hulls. The surf component retains an appearance like the parent or original by-product. The surf-to-undertow ratio by weight was 3-to-1. During collection their electrical charge was measured. Each component was also later chemically analyzed for nitrogen content. This separation experiment was repeated in order that three determinations could be made for each measured value. The average value for the sunflower seed results are presented in Table I, Section B, where the surf component is now listed as meal and the undertow component for sunflower seeds is listed as hull.

The charge per unit mass in nanocoulombs per gram is listed in the first column of data. There is a qualitative and quantitative difference between the two components. The meal has a positive electric value and the hull has a high negative electric value. The differential, acquired during interactions on or over the panel, may reasonably be accepted as the cause for separation of the components. In the second column of Table I, the results of chemical analysis show more than a 60% increase in nitrogen for the meal component over the hull component. These nitrogen values are widely accepted as an indication of the amount of protein in a sample. Thusly, there is an enrichment in protein for the reprocessed meal samples of this sunflower seed by-product. Of the three samples whose improvement is to be described here plus many other that were explored, the crushed sunflower seed with its components of hull fragments and pieces of kernel (meal) has the most coherent motion and ease of separation.

Cottonseed

When the unders from a liquid cyclone process are fed onto the panel (Gardner, Jr., H. K., Hron, Sr., R. J., and Vix, H. L. E., "Removal of Pigment Glands (Gossypol) from Cottonseed" Cereal Chemistry 53, 549–560 (1976)), the component lighter in color is transported in the surfing direction. A second component moves in the opposite direction. These latter particles are mostly pigmented gossypol. The charge per mass for the transported meal is positive. For the separated component, gossypol, the charge per mass is negative. There is again an increase in nitrogen per unit weight for the meal over its parent and over the gossypol enriched component. The meal component has 0.016 g of nitrogen more than the gossypol component for each gram of sample weight. This improvement in nitrogen concentration is similar to but less than that achieved with sunflower seed. The percentages by weight for gossypol were also determined for the cottonseed samples.

This method of using A.C. electricity increased the gossypol fraction for the gossypol component while the meal component had a reduction.

When comparing the mean areas for the cottonseed, the meal component has the smallest size and the gossypol component has the largest size. These measurements reflect qualitative observations on protein and gossypol previously reported (Hron, Sr., R. J., "Differential Settling Test for Evaluation of Liquid Cyclone Classification Performance" *Cereal Chemistry* 58, 334–338 (1981)). Yet, the standard deviations show that the components do not significantly differ in size. The circularity ratios indicate that all samples have about the same shape. Again, image analyses imply that neither size nor shape play a major role in this separation.

EXAMPLE 2

Cottonseed Flour By-Product

Cottonseed "unders" is a powdery by-product from the liquid cyclone process which produces protein flour from cottonseed. One gram of cottonseed "unders" was placed on the surface of the electric contact panel. The panel energized with an A.C. potential of 3 kV, charged all components of the by-product for 40 sec. The potential was then raised to 5 kV for the next 10 sec. This energy impulse levitated the sample as represented in FIG. 1. Simultaneously, some of the sample moved in a forward or "surf" direction (A); and, some of the sample moved in a backward, reverse, or "undertow" direction (B). Voltage was then reduced to the original value and the cycle began again. This impulse-cycle technique, presented in FIG. 2, was repeated for 15 minutes till separation was completed.

Components were collected at opposite sides of the panel. On visual examination the undertow component appears to be many black, pigmented spheres. The surf component is lighter in color and retains an appearance like the parent or original by-product. The surf-to-undertow ratio by weight is 3-to-2. For each component the following properties were measured: (1) During collection, the electrical charge, (2) By later chemical analysis, the contained nitrogen; and (3) the amount of total gossypol. The separation experiment was repeated in order that at least two determinations were made for each measured value. The average value for the cottonseed results are presented in Table I, Section C, where the surf component is listed as meal and the undertow component is listed as gossypol.

The charge per unit mass for the cottonseed meal is a positive electric value and for the gossypol it is a high negative value. Again, this difference may be accepted as the cause for the separation of these components. The results of chemical analysis show a 20% increase in nitrogen for the meal component over the gossypol component. Thereby, there is an enrichment in protein for the refined meal sample of this cottonseed "unders" or by-product. These results are similar to those from sunflower seed. Furthermore, the weight of total gossypol per unit weight of the parent or original by-product was 16.2 mg per gram. Processing this by-product increased this fraction by 18% for the gossypol component while the meal component had a 32% reduction in total gossypol concentration. Thusly, measurements for free gossypol followed the same trend. There is also an enrichment in gossypol for the reprocessed samples of cottonseed "unders". This increase in protein for one component and increase in gossypol for the opposite component is a double benefit.

Wheat Grain

Figure 4:
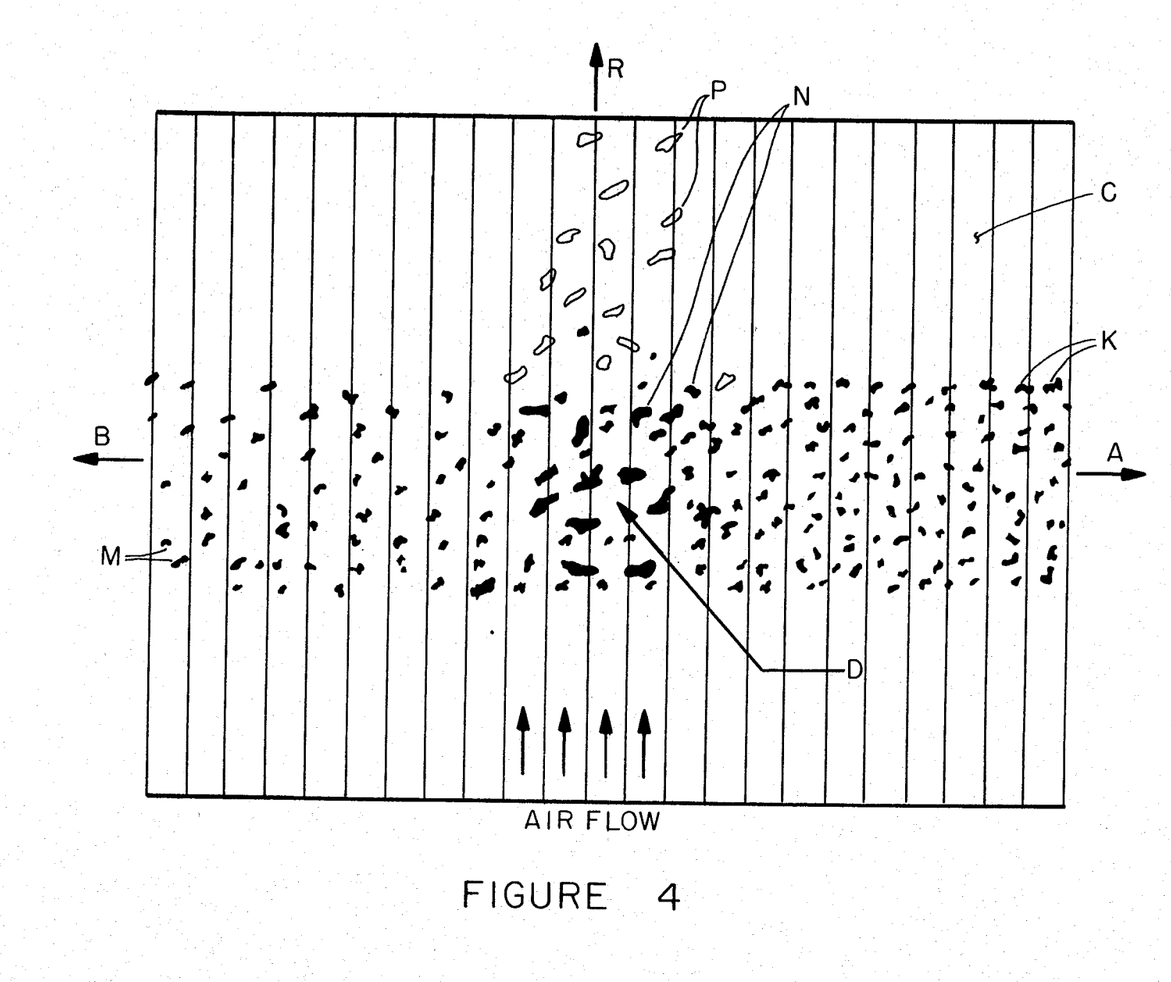
FIG. 4 describes a method of flowing air perpendicular to the components in order to achieve additional separation.

The waste of wheat grain was obtained as dust from the baghouse of a commercial grain elevator. This method, described in FIG. 4, wherein air is flowed perpendicular to the components, unexpectedly separated grain dust into four components—hulls (M) which were ejected into direction (B) the undertow, fragments of grain (N) which remained in section D on the panel, and a conglomerate (K) which rose and surfed in direction (A). The latter (K) was composed of wheat, dust, and chaff (P) (parts of the light, exterior shell). The hull (M) component was charged negatively and the conglomerate (K) was charged positively. The negligibly charged wheat fragments (N) that did not levitate possess the highest nitrogen, the smallest charge-to-mass ration, the largest size. The lack of an increase in nitrogen for the congolomerate (K) is probably due to it being a mixture. It was observed that the fourth component, chaff (P), was removed simultaneously by air flow in direction (R) which is perpendicular to the conglomerate's direction of flow which is (A).

Image analyses indicate that the hull component has the smallest average size and highest uniformity. The parent waste is the most variable in size, reflecting the fact that it consists of at least 4 components. The conglomerate is next in variability probably because of its chaff. For this mixture and its two components, the differences among the mean areas are much less than the ranges indicated by their standard deviations. All three approach a circular cross-section to about the same degree. Neither size nor shape significantly affect this electrical separation. Most important is the fact that the electric contact panel alone separates this waste into three components. Also, when an aerodynamical force was combined with the panel, the fourth component was resolved.

EXAMPLE 3

Grain Elevator By-Product

Waste collected at a baghouse of a grain elevator is a multi-component mixture of fragments from the kernel, hull, and chaff along with the dust from the wheat. Two grams of the wheat by-product were placed on the surface of the electric contact panel. The panel was energized to the same A.C. potentials, for the same times, and with the same cycle of energy as used in Example 1 (Sunflower Seed). The multi-component sample of wheat by-product was charged, levitated, and set in motion. The wheat by-product was separated into three components solely by the panel. Simultaneously, the component appearing to be fragements of hulls moved into the undertow direction. When separation was complete, individual fragments of grain remained on the panel. These fragments were the largest size of all components. The third component, resembling the original by-product, moved in the surf direction. These separated components were collected and the same properties were measured as with the sunflower seed components. The values of Example 3 are presented in Table I, Section D, where the surfed component is designated conglomerate, the undertow is the hull; and, the new component that remained on the panel is wheat.

The charge per unit mass for the conglomerate is positive and the hull component is, again, charged negatively. The wheat fragments possess the smallest charge-to-mass ratio and did not levitate. Here the difference in charge per mass may be the cause for separation of the mixture into three components. The wheat component is automatically recovered on the panel when the conglomerate and hull components are moved off at opposite sides of the panel. The results in Table I, Section D show that this wheat component has greater than 8% more nitrogen than either of the other two components.

Example 3 gives two illustrations that this electrical separation process can be combined with classical mechanical means of separation. First, the component of wheat fragments was simply swept or dumped off the electric contact panel when being collected for measurements. Second, it was observed that the conglomerate component was itself a mixture of yet other (sub) components. This is also reflected in the lack of an increase in its measured nitrogen. In an additional experiment, an air flow of 40 cm/sec causes this component to be separated into two sub-components. The latest separation occurred simultaneously with electrical energizing and with the air flow perpendicular to the conglomerate's direction of motion. A powdery, dust component of wheat continued to move in the same direction and off the same edge of the panel as the conglomerate formerly did. This is also the same direction and same edge as the meal components moved in Examples 1 and 2. A second component of chaff from the wheat, being large and light, was caught by the air flow and moved in a transverse direction over the panel, and collected at a third edge of the panel. Its direction is perpendicular to the conglomerate's and to the hull's directions of flow. The example illustrates two facts. First, the electric contact panel can separate multi-component by-products into three components. Second, when the panel is combined with an aerodynamical force, a fourth component is separated at the same time.

EXPERIMENTAL PARAMETERS FOR THE PRECEEDING EXAMPLES

There are many variables that affect the separation process—e.g., the interactions of the samples with the electric panel, the interactions among the charging components of a sample, the water content of the sample and/or of the air, the construction and cleanliness of the panel, and the amount of electric energy applied to the panel.

Successful separation depends upon the following parameters:

The distance between two adjacent electrical conductors encased in the plastic panel, used here is 3 mm. The distance can be related to the size of the particles in a sample but the distance must not be too greatly oversized. When the distance was 30 mm, the samples of the three examples did not separate and their motion was severely limited.

The amount of moisture in the air over the panel and in the sample should not be too great. Successful action is possible at 70% R.H. Yet, best results are obtained at equal to or less than 55% R.H. In Table I the data of Column 3 shows the moisture regain of these samples after drying. The hulls from sunflower seed and grain have the greatest water absorbing ability. In agreement with the known deleterious effect of moisture on electric fields, their translational speeds during separation are the slowest. In contrast, the low moisture regain of the reference lycopodium is reflected in its vigorous action over the panel. The effect of moisture is opposite to yet less than that of the charge-to-mass ratio. Drying the samples improves their motion on and over the electric contact panel.

The amount of A.C. electric potential needed to separate materials depends upon the environmental conditions are given above and the materials. The electric energy is cycled with time between two values. A curve illustrating the cyclic mixture of potential is given in FIG. 2. One value of potential is needed for charging (E), and a higher value for separation (F). The ranges of potential used are given in Table II in kilovolts, peak-to-peak. Even during an experiment an increase in potential is occasionally helpful. However, never exceed the predetermined highest voltage for separation.

TABLE II

| RANGES OF A.C. ELECTRIC POTENTIAL | | | |
|---|---|---|---|
| Sample | Charging E (kV) | Separation F (kV) | Example |
| Sunflower Seed | 2–4 | 4–6 | 1 |
| Cottonseed | 3–5 | 5–7 | 2 |
| Grain Dust | 2–4 | 4–7 | 3 |

Figure 2:
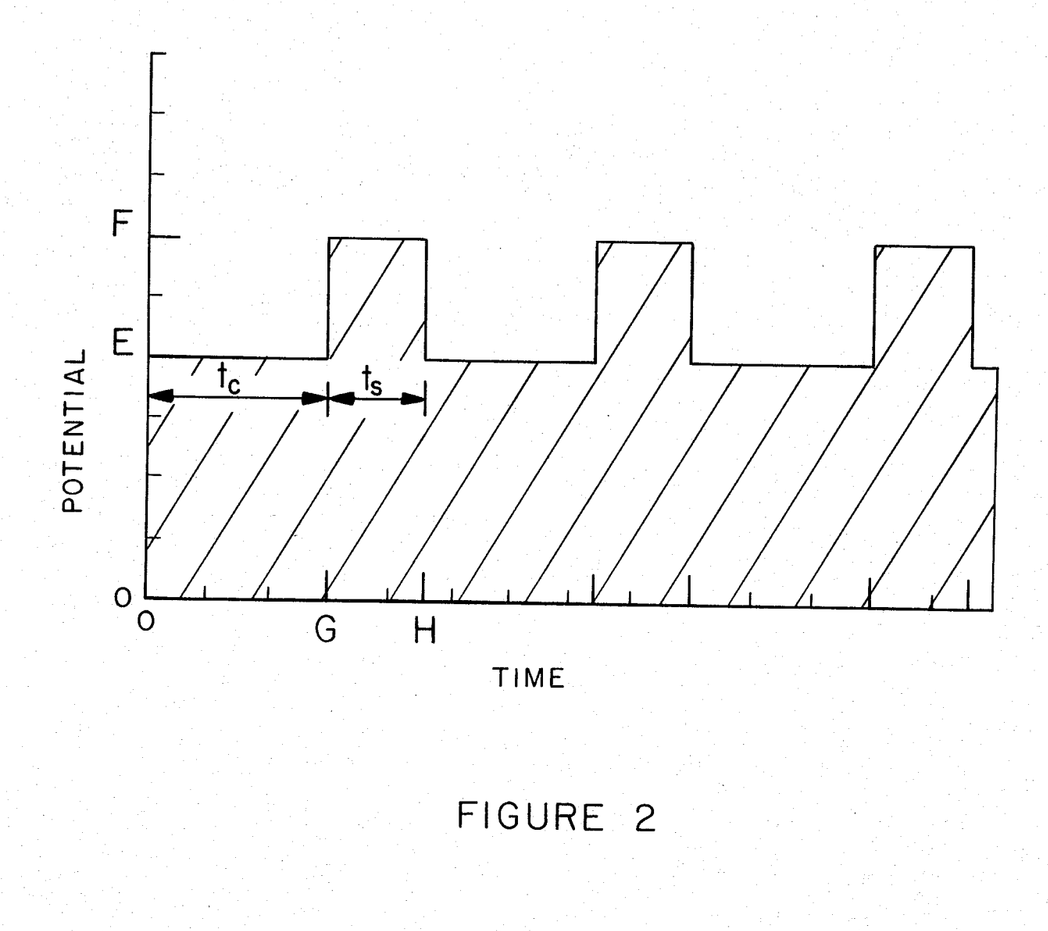
FIG. 2 is a curve representing the impulse cycle technique for A.C. electric potential.
Figure 3:
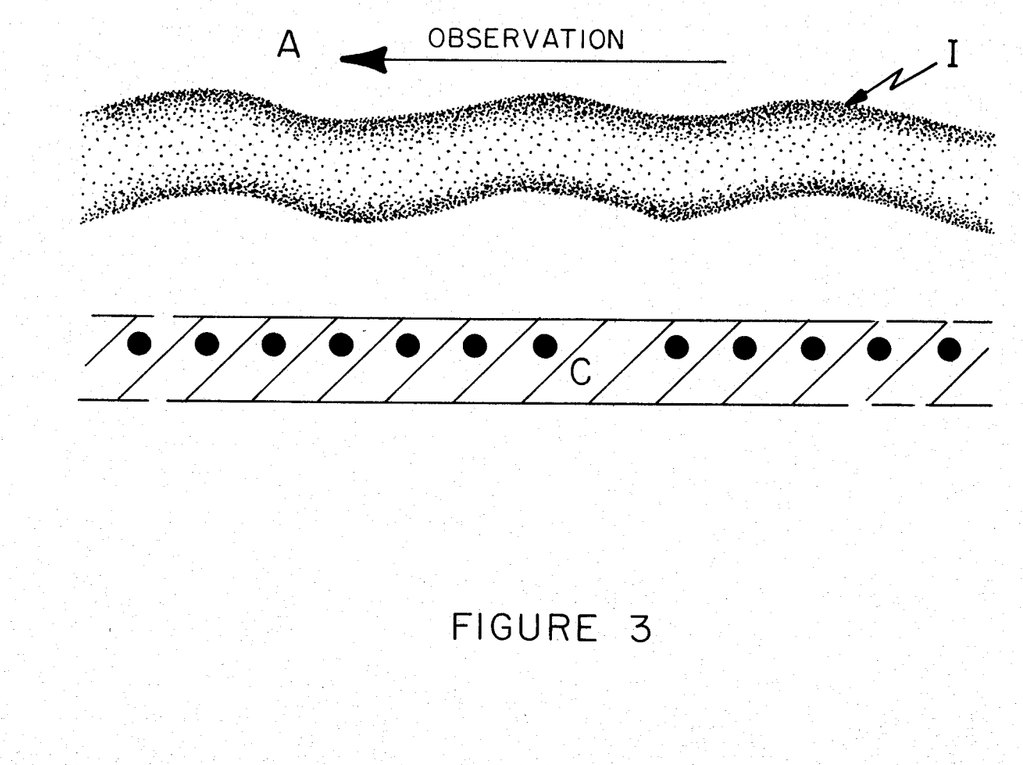
FIG. 3 is a schematic diagram visualizing a method of simple transportation without occurrence of separation of components of agricultural by-products.

In FIG. 2 the time spent in charging "$t_c$", should be greater than the time allotted for separation, "$t_s$". For these samples the range for "$t_c$" was from 20 to 120 sec. For "$t_s$" it was from 5 to 40 sec. These ranges in time could be exceeded. But, the upper range for potential should not be exceeded. As the ranges in the voltages in Table II are exceeded, the separation of components is continuously reduced. As illustrated in FIG. 3, when the electric potential approaches 8 to 9 kV, all components of the sample (I) on the panel (C) will rise; move in the same direction (A); and, there will be no separation. This is known as the transportation mode. The essence of this invention is that all action for separation must take place at voltages below that which gives only transportation.

All preceding descriptions are for panels composed of an epoxy glass. Panels built with other plastic materials; such as, acrylic and polyester, have also performed in the same successful manner. It is necessary that the plastic material insulate the conductors from each other. With different plastic surfaces, separation requires some changes in the voltage parameters.

COMPARISONS

While seed components that are smaller in size are the more uniform, components that are larger are generally the least uniform. The improved or refined meals from both cottonseed and sunflower seed more closely resemble their parents in appearance than do the hulls or gossypol. The meals acquire the same sign or polarization of charges. The charge-per-mass ratio for the meal components of both seeds and the grain are positive while the fragments of hulls from sunflower seed and grain, along with the gossypol from cottonseed, are negative. The resulting increase in nitrogen implies an increase in the protein content for each of the two meal components while the hulls and gossypol that are ejected show a decrease in nitrogen concentration. When the parent for sunflower seed or cottonseed is completely separated, there is a weight loss of about 7%. Using this and multiplying the components weights by their concentrations show that the total nitrogen is conserved during these separations.

The dual action of increasing protein and removing objectionables offers potential use of this process in upgrading sunflower seed powder to an animal feed; in reclaiming meal from grain waste; and, perhaps, in upgrading cottonseed from a feed to a food. As the panel also increases the concentration of gossypol from cottonseed unders, the process may be suitable as an improved source of gossypol which is becoming useful in several new areas of research.

Water content, often important in mechanical processing, is also an important factor in electrical processing. The moisture regain of these samples after drying indicate that hulls from sunflower seed and grain have the greatest water absorbing ability. In agreement with the known deleterious effect of moisture on electric fields, their translational speeds during separation seem to be the slowest. In contrast, the low moisture regain of the reference lycopodium is reflected in its vigorous action over the panel. The effect of moisture is opposite to and probably less than that of the charge-to-mass ratio. The reduced vigor of pigmented gossypol, however, must be attributed to another property, perhaps its different dielectric characteristics or the high negative value of its specific charge.

SEPARATION OF OTHER MIXTURES

Additional by-products were subjected to the electric contact panel. First, in a mixture of cottonseed flour contaminated with *Aspergillus niger*, some flour containing this black mold was vigorously ejected. With cracked rape seed, the kernels were separated from the fragments of their pigmented skins. A more difficult task was that of separating cotton linters from a mixture with small shreds of plastic. The last separation was of cotton trash collected from beneath the card at a textile mill. The vigor of this separation varied for different particles. When separated, each component of cotton trash carried some respirable dust. The separation of these four mixtures are not documented as well as the preceding three examples. With this disclosure, those skilled in the art can envision other useful separations. The charge-to-mass ratios of the components must be different in sign and/or quantity.

We claim:

1. An electrodynamic method for separating components of agricultural by-products comprising:
    (a) feeding onto a horizontal electric undulating traveling wave contact panel an agricultural by-product mixture comprising individual components that can be differentially charged;
    (b) energizing the panel with sufficient charging voltage for sufficient time to impart different charge to mass ratios to the individual components;
    (c) increasing the voltage to a separation voltage for sufficient time to effect separation of the components, said separation voltage being that which is sufficient to move said components, in opposite directions but less than that voltage which is necessary to transport all of the components in the same direction;
    (d) separating the individual components by cyclically repeating steps (b) and (c) until all of the components are moved off of the panel for recovery.

2. The method of claim 1 wherein the agricultural by-products are mixtures selected from the group consisting of: sunflower seed, cottonseed flour, and a multi-component mixture of grain, dust, hull and chaff from wheat.

3. The process of claim 1 wherein the charging time is from about 20 to 120 seconds and the separation time is from about 5 to 40 seconds.

4. The process of claim 1 wherein the agricultural by-product is sunflower seed, the charging voltage is from about 2 to 4 kV and the separation voltage is from about 4 to 6 kV.

5. The process of claim 1 wherein the agricultural by-product is cottonseed, the charging voltage is from about 3 to 5 kV and the separation voltage is from about 4 to 6 kV.

6. The process of claim 1 wherein the agricultural by-product is grain dust, the charging voltage is from about 2 to 4 kV and the separation voltage is from about 4 to 7 kV.

7. The process of claim 1 wherein the agricultural by-products are a multicomponent mixture of grain, dust, hull and chaff from wheat.

8. The process of claim 7 including flowing air perpendicular to the components to effect additional separation.

* * * * *